Patented Nov. 26, 1935

2,021,917

UNITED STATES PATENT OFFICE 2,021,917

AZO DYE AND METHOD FOR ITS PREPARATION

Mordecai Mendoza, West Didsbury, England, assignor to Imperial Chemical Industries Limited, a corporation of Great Britain No Drawing. Application August 23, 1932, Serial No. 630,059. In Great Britain September 21, 1931

8 Claims. (Cl. 260—80)

This invention relates to azo dyestuffs and more particularly refers to disazo dyestuffs especially adapted for dyeing wool and other animal fibers, and methods for their preparation.

It is an object of this invention to produce dyes capable of imparting to wool and other animal fibers uniform shades of excellent fastness to milling, stoving, washing and light. A further object is to prepare dyes suitable for dyeing animal fibers in beautiful even shades, particularly shades of red. Additional objects will appear hereinafter.

These objects are accomplished by the process of the present invention wherein meta-tolidine (2-2'-tolidine) is tetrazotized and coupled with one equivalent each of two different sulfonated naphthols.

The invention may be more completely understood by reference to the following example in which the quantities are stated in parts by weight:

Example 21.2 parts of 2,2'-tolidine were tetrazotized in the customary manner and the tetrazo solution was stirred into a well cooled solution of 34.8 parts of the di-sodium salt of 2-naphthol-6-8-disulfonic acid and 27 parts of sodium carbonate in 400 parts of water. Coupling, which was allowed to proceed for about one hour at 0–5° C., resulted in the formation of a bright yellowish-red solution. There was then added a solution of 34.8 parts of the di-sodium salt of 2-naphthol-3-6-disulfonic acid in 300 parts of water and the mixture was stirred for a further 12 hours.

A deep red solution was obtained from which the disazo dyestuff was isolated by addition of common salt. When dried and ground it was a deep red powder. Wool was dyed by it from an acid bath in a beautiful even clear red shade. The dye bath exhausted extremely well and the dyeings were very fast to washing, stoving, alkaline milling and light.

According to this invention coupling should be carried out in alkaline solution. Each naphthol radical should contain at least one sulfonic acid group, and both naphthol radicals should contain no more than four sulfonic acid groups. In other words, in carrying out the process of this invention a naphthol radical must contain at least one sulfonic acid group and may contain as many as three such groups. In the event that one naphthol radical contains three sulfonic acid groups, the other naphthol radical should contain only one sulfonic acid group.

These sulfonic acid groups may occupy various positions on the naphthol radical provided that coupling with the tetrazotized meta-tolidine is not thereby prevented from taking place. In order to produce a clear red dye it is essential that not more than one naphthol radical should have the sulfonic acid group in position 8 with respect to a 1- or 2-hydroxyl group. It is not necessary that any sulfonic acid group occupy this position, but in case such position is occupied by a sulfonic acid group, care should be taken that the other naphthol radical should not be similarly substituted, otherwise instead of a red dye an orange dye would be produced. These instructions show how to obtain either a red or an orange dye by a proper selection of naphthol compounds substituted with sulfonic acid groups.

Other red dyes similar to that described in the illustrative example may be produced by coupling tetrazotized meta-tolidine with substituted naphthol compounds, according to the instructions previously given. For instance, to produce a clear dye of exceptional stability, tetrazotized meta-tolidine may be coupled with any of the following pairs of substituted naphthols:

| Tetrazotized base | Coupled with— |
|---|---|
| 2,2'-tolidine | 2-naphthol-6,8-disulfonic acid.<br>1-naphthol-4-sulfonic acid. |
| 2,2'-tolidine | 2-naphthol-7-sulfonic acid.<br>1-naphthol-4-sulfonic acid. |
| 2,2'-tolidine | 1-naphthol-4-sulfonic acid.<br>1-naphthol-8-sulfonic acid. |
| 2,2'-tolidine | 2-naphthol-8-sulfonic acid.<br>1-naphthol-4-sulfonic acid. |

These are only a few of the compounds which may be produced without departing from the scope of the present invention but they are sufficiently illustrative so that no difficulty should be encountered in selecting any of the numerous other compounds which may be used.

The dyes produced herein are exceedingly well adapted for dyeing animal fibers. They impart beautiful uniform colors, particularly in the various shades of red, and by a proper selection of coupling components may be made to impart orange shades to the textile material. They are quite stable to washing, stoving, alkaline milling and light; exhaust extremely well; and are exceptionally well adapted for dyeing wool, felt, silk or other material of animal origin.

As many apparently widely different embodiments of this invention may be made without departing from the spirit and scope thereof, it is to be understood that I do not limit myself to the specific embodiments thereof except as defined in the appended claims.

I claim:

1. A process for producing azo dyes which comprises coupling tetrazotized m-tolidine with one equivalent each of two dissimilar naphthol-sulfonic acids.

2. A process for producing azo dyes which comprises coupling tetrazotized m-tolidine with one equivalent each of two dissimilar beta-naphthol-sulfonic acids, both equivalents having substituted thereon no more than four sulfonic acid groups.

3. The process of claim 2 wherein one naphthol-sulfonic acid has a sulfonic acid group in position 8 with respect to a 2-hydroxyl group.

4. A process for producing an azo dye which comprises coupling tetrazotized m-tolidine with one equivalent of 2-naphthol-6-8-disulfonic acid and one equivalent of 2-naphthol-3-6-disulfonic acid.

5. Azo dyes having the following general formula:

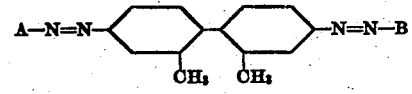

wherein A and B represent the radicals of dissimilar naphthol-sulfonic acids.

6. Azo dyes having the following general formula:

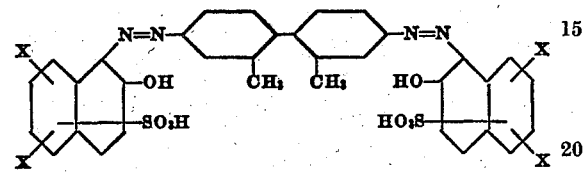

wherein X represents hydrogen or a sulfonic acid group, both naphthol radicals having substituted thereon no more than four sulfonic acid groups and wherein the naphthol radicals are dissimilar.

7. The products defined in claim 6 wherein one naphthol radical has a sulfonic acid group in position 8 with respect to a 2-hydroxyl group.

8. An azo dye having the following formula:

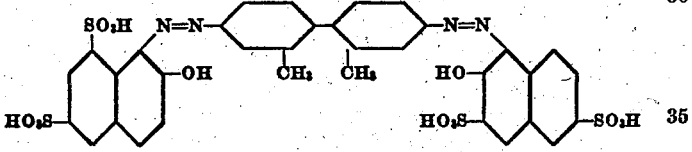

MORDECAI MENDOZA.